United States Patent Office 3,716,718
Patented Feb. 13, 1973

3,716,718
LOSS OF PHASE DETECTOR FOR A POLYPHASE POWER SYSTEM
John R. Nowell, Phoenix, and Luther L. Genuit, Scottsdale, Ariz., assignors to Honeywell Information Systems Inc., Waltham, Mass.
Filed Apr. 3, 1972, Ser. No. 240,608
Int. Cl. H02j 3/00
U.S. Cl. 307—13                                        4 Claims

ABSTRACT OF THE DISCLOSURE

The improved loss of phase detector employs a plurality of diodes connected between a transistor and a polyphase A.C. power system. A single transistor and a silicon unilateral switch provide an alarm signal when power is lost in any one of the phases of the polyphase system. Few components are used so the cost of the detector is relatively low.

BACKGROUND OF THE INVENTION

This invention relates to loss of phase detectors for a polyphase power system and more particularly to an inexpensive detector which provides a warning signal when there is a loss of power in any phase of the polyphase power system.

In data processing systems, polyphase power sources are often used to provide A.C. power to the rectifier power supply. The individual phases of the polyphase source are used to provide power for cooling fans, for electric motors and for relays in the processing system. If a line should open in any one of the individual phases of the polyphase source, the cooling fans operating on that phase would not function, so that heat could cause excessive damage to circuit boards and other parts in the data processing system. In addition, an open line could cause voltage from the rectifier power supply to decrease so that data signals could have incorrect values and important data which is stored in the processing system could be lost. Loss of power in one phase of the polyphase system would also cause increased current in the remaining phases of the power supply system which could overload the rectifiers and transformers windings, thereby causing possible damage to these components. The ripple output voltage of the power supply would also increase, which could cause damage to the filter capacitors in the rectifier power supply and could cause noise and error signals to be introduced into the data processing system. It is therefore important that the loss of power in any one phase of the power system be quickly detected so that corrective measures can be taken.

Some prior art loss of phase detectors use a plurality of transistors to detect the loss of power in a phase of a polyphase power system. These prior art detectors require a power supply to provide a D.C. reference voltage. The use of a D.C. voltage and the use of a plurality of transistors cause the prior art detectors to be relatively expensive. The present invention alleviates the disadvantages of the prior art by providing a loss of phase detector which uses a single transistor. The present invention further alleviates the disadvantage of the prior art by using A.C. power from the polyphase system so that a separate D.C. reference voltage is not used. The present invention uses a transformer between the transistor and a pair of output terminals to provide D.C. isolation between the transistor and the output terminals. The transformer also reduces the amount of noise which is coupled to the output terminals. A resistor and a capacitor connected to the transistor reduce the sensitivity of the detector to noise on the lines from the polyphase power system.

The present invention provides an inexpensive circuit which checks the voltage output of each phase of the polyphase power system and provides a warning signal when the power is lost in any one of the phases of this polyphase power system. This circuit uses a few inexpensive parts to provide a loss of phase detector which features high reliability and low cost.

It is therefore, an object of the invention to provide a new and improved detector which detects a loss of power in one or more phases of a polyphase power system.

Another object of this invention is to provide a reliable and inexpensive detector to detect a loss of power in one or more phases of a polyphase power system.

A further object of this invention is to provide a new and improved detector which provides isolation between the loss of phase detector and other portions of the power supply circuit.

Still another object of this invention is to provide a loss of phase detector having a means for reducing the sensitivity to noise in the detector.

SUMMARY OF THE INVENTION

The foregoing objects are achieved in the instant invention by providing a new and improved loss of power detector in which signals are coupled from each phase of the power system to a detector. These signals prevent the detector from developing an error signal when all phases of the power supply are energized. When any one or more phases are not energized the detector provides an error signal which causes an indicating device to provide a warning signal. This warning signal can be used to shut down the data processing system in an orderly manner and thereby prevent loss of important data.

Other objects and advantages of this invention will become apparent from the following description when taken in connection with the accompanying drawings.

DESCRIPTION OF THE PREFERRED EMBODIMENT

Figure 1:
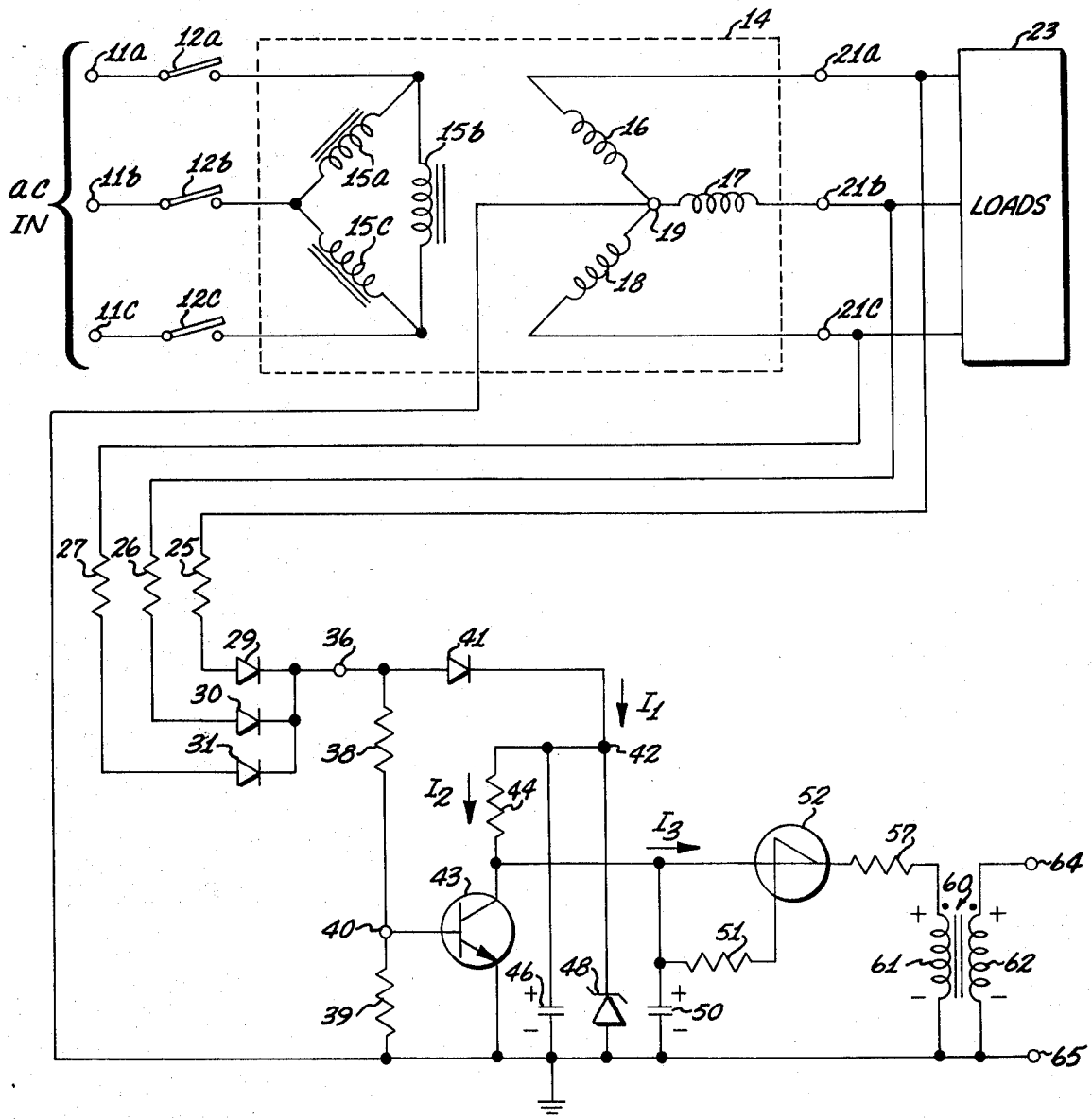
FIG. 1 discloses a circuit diagram of one embodiment of the present invention.

The circuit shown in FIG. 1 includes a transformer 14 having a plurality of primary windings 15a–15c and a plurality of secondary windings, 16, 17 and 18. The primary windings of the transformer are connected through a plurality of switches 12a–12c to a plurality of input terminals 11a–11c which are connected to a source of 3-phase, A.C. power. A plurality of loads 23 are connected to the various phases of the secondary windings. The secondary windings are connected in a Y configuration, with a common or neutral terminal 19 being connected to a source of reference potential, such as ground. The three phases of the secondary windings of the transformer are each connected to a corresponding phase terminal 21a–21c which are each connected to the anode of a corresponding rectifier 29–31 through one of the resistors 25–27. The cathodes of rectifiers 29, 30 and 31 are connected to a voltage divider comprising resistors 38 and 39. The center of the voltage divider is connected to the base of a transistor 43. The collector of transistor 43 is coupled to the cathodes of rectifiers 29–31 by resistor 44 and diode 41. The emitter of transistor 43 is connected to the neutral terminal 19 of the 3-phase transformer 14.

Figure 2:
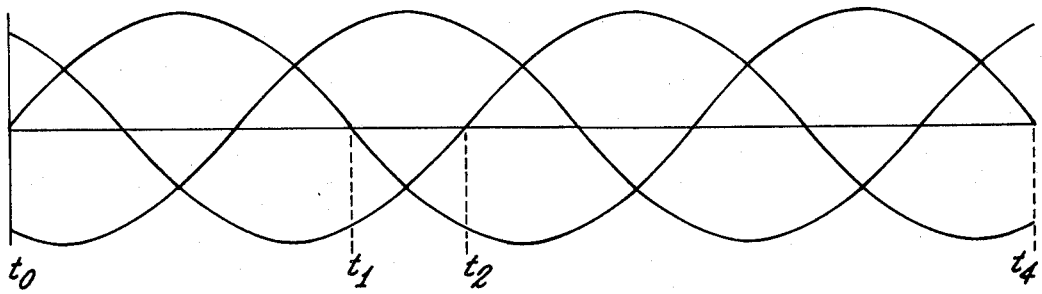
FIG. 2 illustrates the output of the transformer when all phases of the polyphase system are energized.
Figure 4:
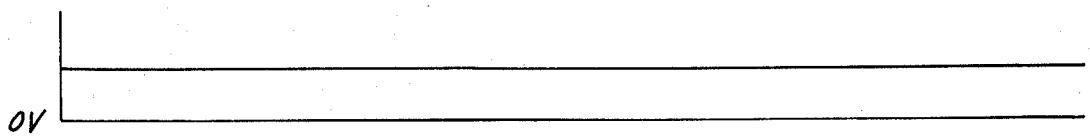
FIG. 4 illustrates the output of the rectifiers when all of the phases of the polyphase system are energized.

Diode 41 and Zener diode 48 limit the positive value of the voltage at terminal 36. The Zener diode has a characteristic of providing a constant voltage drop across its terminals for a wide range of amplitude of currents flowing through the Zener diode in a reverse direction. Therefore the voltage difference between the junction point 42 and ground will be constant when current flows from junction point 42 through Zener diode 48. When the voltage from any of the phase terminals 21a–21c is more positive than the voltage drop across the Zener diode, the voltage at terminal 36 will be the voltage drop across the Zener diode plus the voltage drop across the diode 41. For example, when a 15 volt Zener diode is used the voltage across Zener diode 48 is 15 volts and the voltage across diode 41 is .7 volt to give a total of +15.7 volts at terminal 36 when any of the phase voltages is greater than 15.7 volts. When each of the phases of a 3-phase 220 volt source provides a voltage one of the phases is always greater than +15.7 volts as shown in the waveform of FIG. 2. When all 3 phases are as shown in FIG. 2 the voltage coupled through rectifiers 29–31 provides a steady value of voltage to terminal 36 as shown in FIG. 4.

When the voltage at terminal 36 is +15.7 volts a current $I_1$ flows from terminal 36 through diode 41 to junction point 42. At junction point 42 the current $I_1$ splits. A portion of the current $I_1$ flows through the Zener diode 48 and another portion of current $I_1$ charges capacitor 46 to the polarity shown in FIG. 1. The positive voltage at terminal 36 is coupled through resistor 38 to the base of transistor 43 thereby rendering transistor 43 conductive. When transistor 43 is rendered conductive the impedance between the collector of transistor 43 and ground is low so that the voltage at the collector of transistor 43 is low. When the voltage at the collector of transistor 43 is low this voltage is not great enough to cause the silicon unilateral switch to be rendered conductive so there is no current through switch 52 or through the primary winding 61 of transformer 60. When there is no current through the primary winding 61 there is no voltage across the secondary winding 62 and no signal at output terminals 64 and 65.

Figure 3:
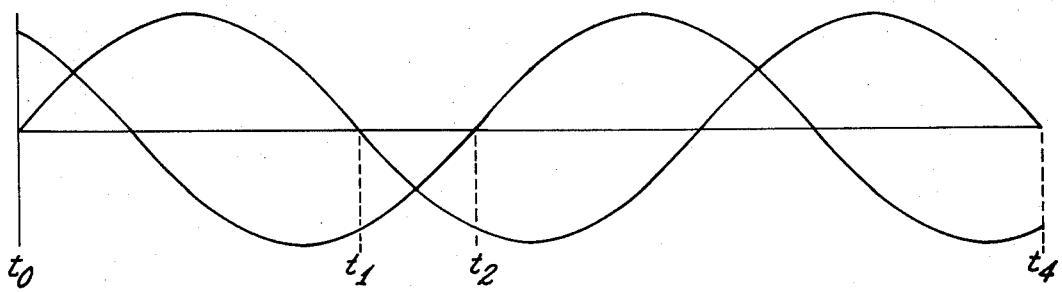
FIG. 3 illustrates the output of the transformer when one of the phases of the polyphase system is not energized.
Figure 5:
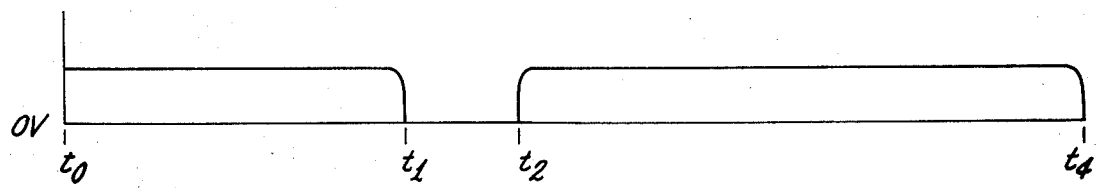
FIG. 5 illustrates the output of the rectifiers when one of the phases of the polyphase system is not energized.

When there is a loss of voltage in one phase of the power supply transformer 14 provides the voltage waveform shown in FIG. 3. The loss of voltage in one phase causes the voltages from transformer 14 to be negative during a portion of the time, for example between times $t_1$ and $t_2$ in FIG. 3. Between time $t_1$ and $t_2$ the voltage at terminal 36 has a value of zero as shown in FIG. 5. The zero value of voltage at terminal 36 causes transistor 43 to be rendered nonconductive. When transistor 43 is rendered nonconductive the charge on capacitor 46 provides a positive voltage at the collector of transistor 43. The positive voltage at the collector of transistor 43 and at the anode of the silicon unilateral switch 52 causes switch 52 to be rendered conductive.

The silicon unilateral switch is a semiconductor device having an anode, a cathode and a gate. The silicon unilateral switch can be used as an ON-OFF switch that can be turned on or off in a fraction of a millisecond. Normally the silicon unilateral switch cannot conduct current from anode to cathode thereof until a positive voltage greater than a threshold value or "switching voltage" exists between the anode and the cathode. If a positive voltage greater than the switching voltage exists between the anode and the cathode the switch "turns on" i.e. is rendered conductive and the current will flow from the anode to the cathode. Once anode-cathode flow commences the switch can be "turned off" i.e., rendered nonconductive by reducing the anode to cathode current flow below a "holding current" or minimum current value. The gate of the silicon unilateral switch can be connected through a resistor to the anode so that a sudden increase in voltage on the anode will not cause a sudden increase of current which may cause damage to the silicon unilateral switch. If voltages on the anode do not change suddenly the gate of the switch can be left disconnected.

When switch 52 is rendered conductive a current $I_3$ flows from the upper plate of capacitor 46, through resistor 44, switch 52, resistor 57 and primary winding 61 to the lower plate of capacitor 46. Current $I_3$ through the primary winding 61 provides a voltage drop of the polarity shown across primary winding 61. The curernt through the primary winding 61 also produces a voltage of the polarity shown across secondary winding 62. This voltage across secondary winding 62 can be applied to the gate of a silicon controlled rectifier or to some other device which will provide a warning signal to the data communications system.

Capacitor 50 and resistor 44 provide noise immunity in the detector by limiting the rate of change in voltage at the anode of switch 52 and prevent noise from causing the switch to conduct when power is provided to all phases of the transformer 14. For example, a negative noise pulse from an output terminal of transformer 14 may cause the voltage at terminal 36 to drop to a value of zero. This low value of voltage would cause transistor 43 to be rendered nonconductive. If capacitor 50 were not included in the circuit the voltage at the anode of switch 52 would increase to a value great enough to cause switch 52 to conduct and to provide a signal to output terminals 64 and 65. In the improved circuit of FIG. 1 resistor 44 and capacitor 50 prevent the voltage at the anode of switch 52 from increasing suddenly. During noise pulses having short time durations only a small amount of charge flows from the upper plate of capacitor 46 through resistor 44 to the upper plate of capacitor 50. The voltage on capacitor 50 changes a small amount so that switch 52 is not rendered conductive.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

What is claimed is:

1. Apparatus for detecting loss of power in a phase of a polyphase power supply comprising:

a power source having a neutral terminal and a plurality of phase terminals, each of said phase terminals being coupled to one phase of said supply, said neutral terminal being coupled to a reference phase of said supply;

a transistor having a base, a collector and an emitter, said emitter of said transistor being connected to said neutral terminal;

a plurality of rectifiers having first and second leads;

a plurality of coupling resistors, each of said coupling resistors being connected between a corresponding one of said phase terminals and said first lead of a corresponding one of said rectifiers;

a diode having an anode and a cathode, said second lead of each of said rectifiers being connected to said anode of said diode;

first, second and third dropping resistors, said first dropping resistor being connected between said anode of said diode and said base of said transistor, said second dropping resistor being connected between said base of said transistor and said emitter of said transistor, said third dropping resistor being connected between said collector of said transistor and said cathode of said diode;

a first capacitor, said first capacitor being connected between said emitter of said transistor and said cathode of said diode;

first and second output terminals;

a silicon unilateral switch, said switch being connected between said collector of transistor and said first output terminal, said second output terminal being connected to said emitter of said transistor; and a Zener diode, said Zener diode being connected between said cathode of said diode and said emitter of said transistor.

2. Apparatus for detecting loss of power in a phase of a polyphase power supply as defined in claim 1 including:

a second capacitor, said second capacitor being connected between said collector of said transistor and said emitter of said transistor.

3. Apparatus for detecting loss of power in a phase of a polyphase power supply as defined in claim 1 including:

a fourth dropping resistor; and a transformer having a primary winding and a secondary winding, said fourth dropping resistor being connector between said switch and a first end of said primary winding of said transformer, a second end of said primary winding of said transformer being connected to said emitter of said transistor, said first output terminal being connected to a first end of said secondary winding of said transformer, said second output terminal being connected to a second end of said secondary winding of said transformer.

4. Apparatus for detecting loss of power in a phase of a polyphase power supply as defined in claim 1 including:

a second capacitor, said second capacitor being connected between said collector of said transistor and said emitter of said transistor;

a fourth dropping resistor; and a transformer having a primary winding and a secondary winding, said fourth dropping resistor being connected between said switch and a first end of said primary winding of said transformer, a second end of said primary winding of said transformer being connected to said emitter of said transistor, said first output terminal being connected to a first end of said secondary winding of said transformer, said second output terminal being connected to a second end of said secondary winding of said transformer.

References Cited

UNITED STATES PATENTS

| | | | |
|---|---|---|---|
| 3,340,459 | 9/1967 | Fields | 307—232 |
| 3,427,471 | 2/1969 | South | 307—232 |
| 3,510,683 | 5/1970 | Rotier | 328—133 |

STANLEY D. MILLER, JR., Primary Examiner

R. E. HART, Assistant Examiner

U.S. Cl. X.R.

307—232; 317—27; 330—113